Jan. 4, 1966

F. B. STENCEL 3,227,402

ANTI-BOUNCE CONTROLS

Filed Oct. 12, 1962

INVENTOR.
Fred B. Stencel
BY *Arnold Ey Raylance*
ATTORNEY

Jan. 4, 1966    F. B. STENCEL    3,227,402
ANTI-BOUNCE CONTROLS
Filed Oct. 12, 1962    2 Sheets-Sheet 2

INVENTOR.
Fred B. Stencel
BY
Arnold & Roylance
ATTORNEY

United States Patent Office 3,227,402
Patented Jan. 4, 1966

3,227,402
ANTI-BOUNCE CONTROLS
Fred B. Stencel, Asheville, N.C., assignor to Stencel Aero Engineering Corporation, Asheville, N.C., a corporation of North Carolina
Filed Oct. 12, 1962, Ser. No. 230,035
10 Claims. (Cl. 244—138)

This invention relates to anti-bounce controls for use in conjunction with rocket cushioning devices of the type designed to cushion the landing of an aerial load.

As employed herein, the term "aerial load" is intended to include all loads descending from a point in air or space to a landing surface, whether the load be delivered by a supporting parachute, a guiding or drogue parachute, a paraglider, a rotary descent device, or in free fall, whether the load commences its flight from an aircraft, missile or other type of vehicle, and whether the landing surface be ground or water. The load itself may be an escape capsule of an aircraft, missile or space vehicle; a vehicle itself; any of various pieces of equipment and material which it is desirable to deliver or recover by parachute or in free fall; personnel; or other objects.

In a copending application by the same inventor, Serial No. 84,307, filed January 23, 1961, now Patent 3,116,901, issued January 7, 1964, there is described a system employing retrograde rockets (retrorockets) to cushion the landing of an aerial load. In a preferred embodiment of the invention described in the earlier application, the velocity of the descending load is reduced initially by a parachute deployed at some distance above the landing surface, and the final reduction to approximately zero velocity for touchdown is accomplished by firing retrorockets when the load reaches a height of just a few feet above the landing surface. A mechanical sensor, in the form of a probe protruding downwardly from the bottom of the load, ignites the cushioning retrorockets when the bottom of the load reaches some predetermined distance above the landing surface. The rockets are designed to counteract the downward momentum of the load, so that ideally it reaches zero velocity precisely at the moment of touchdown upon the landing surface.

However, should there by a variation from the calculated value in either the momentum of the load at the instant of rocket turn-on or the thrust of the rocket motors, the load will not touchdown with zero velocity. In particular, if the load momentum is less than the rocket thrust, the rockets will overcompensate. They will stop the load at some point above the surface, and will then reverse its direction, pushing it upwards away from the landing surface. This reversal of direction will be referred to herein as a "bounce"; it is not required, for a bounce, that the load actually touch the surface and rebound therefrom, only that it reverse direction at some point relatively close to the surface.

Such a bounce can become serious if there is a wide discrepancy between the rocket thrust and the momentum of the descending load. In such a case, the rocket motors will continue to burn for a considerable period of time after bringing the load to a standstill, pushing the load upward to a considerable height above the surface before burning out. When the rocket motors stop (burn out) the load will then fall through a distance sufficient to cause damage.

The object of this invention is to provide a control, usable in conjunction with a rocket cushioning system, which will prevent bouncing of the load, and which will permit the load to free fall from a safe height, or will cause it to be gradually lowered to the surface at a safe speed.

This object is accomplished in the present invention by providing means to sense any reversal of load motion and means to turn off the rocket motors, or to completely dissipate or greatly reduce their effective thrust, upon the sensing of any such reversal. Since the rocket motors are not turned on until the load gets within a few feet of the surface, the load will be quite close to the surface when any reversal of direction takes place. If the rocket motors are turned off, or their thrust dissipated completely, as soon as reversal occurs the load will free fall through a distance so small that no damage will be done. Even this small impact may be lessened if, instead of turning the rockets off or completely dissipating their thrust, then thrust is merely reduced to some small fraction of normal value, not sufficient to drive the load upward, but sufficient to cushion the fall somewhat.

The invention may be more completely understood by reference to the following detailed description taken in conjunction with the drawings, which form a part of this specification, and in which.

Figure 1:
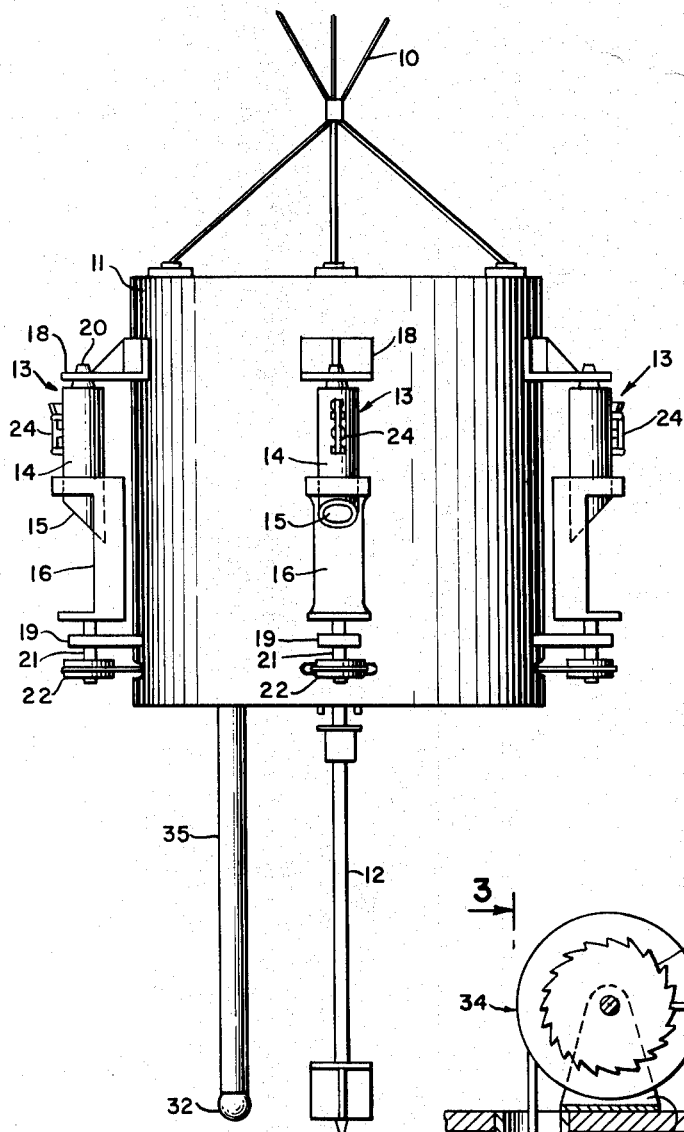
FIG. 1 is an elevational view of an aerial load incorporating one embodiment of this invention in conjunction with a rocket cushioning system.

Referring now to FIG. 1, there is shown a cylindrical load carrier or container 11 suspended from a parachute (not shown) by shroud lines 10. This aerial load is equipped with a rocket cushioning device in accordance with the copending application of the same inventor, Serial No. 84,307, filed January 23, 1961. The rocket cushioning device will be described herein only to the extent necessary for an understanding of the operation of this invention in conjunction therewith; for a more detailed explanation of the operation of the rocket cushioning device, reference should be had to the said copending application.

A surface probe 12 extends downwardly from the bottom of load container 11 and is used as a mechanical sensor to indicate the arrival of the bottom of the container a predetermined distance above the landing surface. The cushioning of the load is supplied by four rocket motors 13 mounted about the periphery of load container 11. The rocket motors comprise cylindrical propellent chambers 14 whose nozzles 15 are angled, for example, 45° from the side of container 11, and are adapted to supply a thrust at that angle, with the horizontal thrust component being provided within a plane intersecting the center of gravity of the load. Rigidly connected to each propellant chamber 14 is a shield 16. Each propellant chamber and shield assembly is adapted to be rotated about an axis parallel to the side of load container 11, and is suitably mounted in bearing brackets 18 and 19 by means of tapered stub shaft 20 attached to the top of chamber 14 and shaft 21 attached to the bottom shield 16, respectively. Rotation of each rocket motor assembly is accomplished by pulleys 22 each of which is attached to an extension of shaft 21 which protrudes through bracket 19. The pulleys 22 are mechanically connected to, and driven by, the upper end of probe 12, by means not shown in FIG. 1.

In operation, when the descending load approaches the landing surface, the end of probe 12 contacts the surface and mechanically senses both the existence of the surface and any horizontal component of the motion of the load with respect to the surface. By means of the mechanical linkages to pulleys 22, rocket motors 13 are rotated so that when ignited their thrust will compensate both for the vertical and horizontal components of the impact velocity vector. Probe 12 is arranged so that it may slide up inside load 11 for a short distance, while the rotational adjustment of rocket motors 13 is being made. At the end of this sliding motion, probe 12 ignites rocket motors 13 through an electrical circuit, and the rocket motor thrust cushions load container 11 during the terminal portion of its descent. What has been described thus far comprises a portion of the invention of copending application, Serial No. 84,307, now U.S. Patent No. 3,116,901.

As mentioned briefly above, the anti-bounce control of this invention comprises a combination of a sensing means, for sensing a reversal in the direction of motion of load container 11, and means responsive to the motion reversal sensing means, to render the rocket either completely ineffective or only slightly effective. In the embodiment shown in FIG. 1, and in detail in FIGS. 2, 3 and 4, the sensing means includes a lead ball 32 attached to a cable 33 and mounted at the end of a frangible tube 35 which depends from the bottom of container 11. The rocket disabling means comprises a means 24 for venting the propellant cylinder 13 and thus turning off the rocket.

Figure 4:
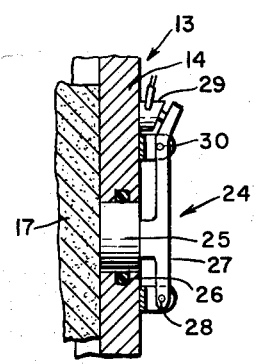
FIG. 4 is a side elevational view, partly in section, of a rocket venting device used in the embodiment shown in FIG. 1.

The rocket venting means is shown in greater detail in FIG. 4. Rocket motors 13, as used in this embodiment, are of the type using solid rocket propellants. This type of rocket may be extinguished by reducing the pressure in the propellant chamber, such as by venting the chamber at some point other than the nozzle through which the burning combustion products normally pass. Venting means 24 is therefore adapted to vent propellant chambers 14 of rocket motors 13 and thereby extinguish these motors. Each venting means 24 comprises a blowout plug 25 fitted tightly into an aperture in the wall of propellant chamber 14, with an O-ring seal 26 surrounding the periphery of plug 25 and providing a tight seal with the wall of propellant chamber 14. Plug 25 is held in place in the wall of chamber 14 by means of the pressure exerted by lever 27. Lever 27 is pivoted at its lower end on a pin 28 and is secured at its upper end by shear pin 30. As long as shear pin 30 remains intact, lever 27 is held in a position generally parallel to the wall of chamber 14 and blowout plug 25 is held tightly in place. An electrically actuated explosive charge 29 is attached to the outside of the wall of chamber 14 and is attached to an extension of lever 27 which projects upwardly above shear pin 30. When charge 29 is actuated in response to an electrical signal from the sensing means, it shears pin 30 and blasts the upper end of lever 27 away from the wall of propellant chamber 14, throwing lever 27 in a clockwise direction around pin 28. With lever 27 no longer holding blowout plug 25 in place, the pressure existing on the inside of propellant chamber 14 will blow it out of the wall, thus venting the chamber and extinguishing the rocket motor. It is obvious that, rather than relying solely upon the chamber internal pressure to blow plug 25 from the wall, it is possible to mechanically link plug 25 with lever 27, in which case the force exerted by explosive charge 29 in forcing lever 27 away from the wall will assist in pulling out plug 25. All of explosive charges 29 are electrically interconnected, as for instance in the circuit shown in FIG. 8, to be ignited simultaneously, so that burning solid propellant charges 17 will be simultaneously extinguished by the venting action.

Figure 3:
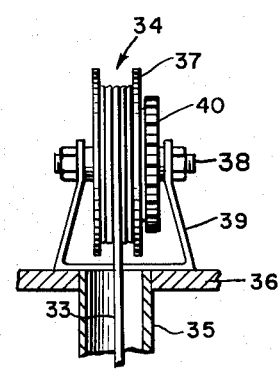
FIG. 3 is an end elevational view of a portion of FIG. 2, taken along the line 3—3.
Figure 2:
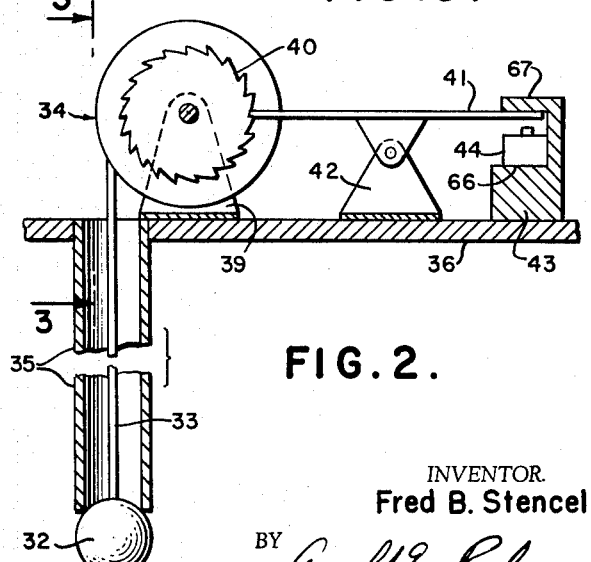
FIG. 2 is a side elevational view, partly in section, of the sensing probe used in the embodiment shown in FIG. 1.

The sensing device used to provide the electrical signal for ignition of the venting means just described, may be seen in the over-all elevational view of FIG. 1 and in the more detailed views of FIGS. 2 and 3. A ball 32 of lead or similar heavy material is attached to the end of a flexible cable 33, with the other end of cable 33 being attached to spool 37 of rewind reel 34. Spool 37 is mounted for rotation about shaft 38 which is in turn journaled within the two arms of bracket 39 mounted upon bottom wall 36 of container 11. Reel 34 is spring-biased, by means not shown, so that it tends to rotate in a clockwise direction (as viewed in FIG. 2) and therefore tends to wind up cable 33 upon spool 37. A frangible tube 35 of tempered glass or the like fits into a hole in bottom surface 36 and extends downwardly below the bottom of container 11. Cable 33 extends from reel 34 down through tube 35, and ball 32 rests against the end of tube 35, having a diameter greater than the inside diameter of tube 35 so that it cannot pass through the tube. A ratchet wheel 40 is rigidly attached to spool 37 and rotates with it upon shaft 38. A bracket 43 is mounted upon bottom surface 36 at a point spaced from reel 34. Bracket 43 has a horizontal mounting surface 66 raised above the level of bottom surface 36, and upon which is mounted switch 44. A portion 67 of bracket 43 extends horizontally above switch 44, forming a stop member. A resilient lever 41 is pivotally mounted intermediate its ends on a bracket 42, which is secured to bottom wall 36. One end of lever 41 engages the teeth of ratchet wheel 40; the other end of the lever engages alternatively upper stop member 67 of bracket 43 or switch 44. If the ratchet wheel 40 should be rotated clockwise (as viewed in FIG. 2) the rounded back of the teeth on the ratchet wheel slide by the end of lever 41, bending the left end of the lever downward slightly, and because of the resiliency of the lever keeping the right-hand end pressed upward into engagement with upper stop member 67. Should ratchet wheel 40 rotate in a counterclockwise direction, the upstanding front edge of the ratchet teeth catch the left end of lever 41 and pivot the right-hand end of the lever downward into contact with switch 44, actuating the switch.

In operation, when descending load container 11 nears the landing surface, the contact of lead ball 32 with the landing surface will shatter tube 35, thus freeing the ball for movement relative to bottom surface 36 of container 11. As long as load 11 continues its downward motion with respect to the landing surface, there will be slack in cable 33, which will be taken up by reel 34. However, should the motion of container 11 reverse itself prior to landing lead ball 32 will tend to pull cable 33 from reel 34, since ball 32 has been designed so that its weight in the ambient gravitational field is greater than the spring bias of reel 34. Then, as soon as ball 32 starts to pull cable 33 from reel 34, reel 34 will tend to rotate in a counterclockwise direction, pivoting lever 41 into engagement with switch 44. As may be seen from FIG. 8, switch 44, when actuated, connects a battery 68 with the parallel connected combination of explosive charges 29. The explosive charges will then be simultaneously set off, venting and therefore extinguishing all of rocket motors 13. As soon as the rocket motors are extinguished, the incipient upward bouncing motion of container 11 will be stopped, and it will drop onto the landing surface from some very low altitude, normally a few feet.

Frangible tube 35 prevents cable 33 from being wound up upon reel 34 prior to the contact of ball 32 with the landing surface. However, since the weight of ball 32, acting downwardly, is greater than the force of the spring bias of reel 34 tending to pull cable 33 upwardly, some means is needed to prevent cable 33 from tending to unwind from reel 34 before ball 32 reaches the landing surface. Should cable 33 tend to unwind from reel 34, it would actuate switch 44 and explosive charges 29 before load 11 approached the landing surface, thus rendering the entire rocket cushioning device inoperative. As long as the downward velocity of the load is equal to or greater than free fall, there is no tendency for the ball 32 to pull away from container 11. However, should the parachute-checked velocity of the load decrease to a point substantially below that of free fall, ball 32 would tend to pull away from container 11 and some checking means must be incorporated to prevent this. One way of accomplishing this is to make cable 33 only long enough to allow ball 32 to rest upon the bottom of tube 35, so that there is no more cable to be unwound from reel 34. Another way is to provide some type of check to prevent any further counterclockwise rotation of reel 34. This may be done, for instance, by an electrically operated clutch, or other reel engaging mechanism, which prevents motion of the reel prior to the firing of the retrorockets, with the reel locking mechanism being released by the same electrical signal which fires the rockets. For purposes of drawing simplicity, these means for presenting untimely pull-out of cable 33 are not illustrated.

Since, as mentioned above, probe 12 moves upward for some distance (to permit mechanical adjustment of the rocket angle) before the rockets are fired, tube 35 is preferably of such a length that lead ball 32 is positioned at a point slightly above the bottom of probe 12, so that it engages the landing surface at precisely the instant when probe 12 has retracted far enough to fire the retrorockets. Thus, the anti-bounce device is rendered operative at the instant the rocket cushioning device is actuated, and prior to the time at which any bounce can occur.

Figure 5:
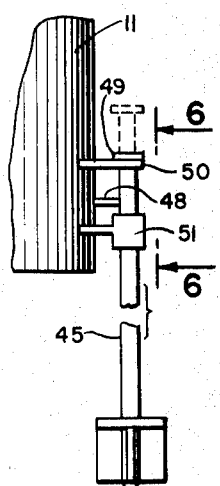
FIG. 5 is a side elevational view illustrating a modified form of probe.
Figure 6:
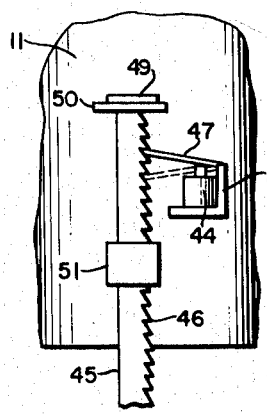
FIG. 6 is a front elevational view of a portion of the probe of FIG. 5, taken along line 6—6.
Figure 8:
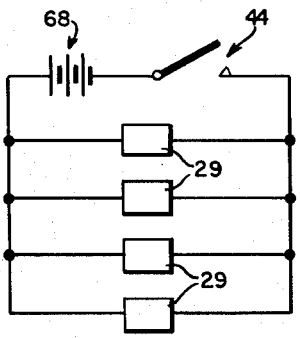
FIG. 8 is a schematic diagram of a circuit for firing the detonators used to actuate the rocket disabling or thrust dissipating means.

Another embodiment of a sensing means is shown in FIGS. 5 and 6. In this embodiment a rigid probe, rather than the flexible cable previously described, is used. An elongated rod 45, having a rectangular cross-section, is mounted for vertical sliding movement in brackets 50 and 51 which are attached to the side of container 11. Rod 45 has an enlarged head 49 at its upper end, which head will not pass through the hole in bracket 50 and, therefore, limits the downward movement of rod 45. The bottom of rod 45 may be constructed in a manner similar to bottom of probe 12 as shown in FIG. 1. Along one side of rod 45 are a series of ratchet teeth 46. A bracket 48 is attached to the surface of container 11 at a point spaced from rod 45; a switch 44 is mounted upon bracket 48 and one end of a resilient arm 47 is attached to the bracket. The other end of arm 47 engages ratchet teeth 46. Arm 47 and ratchet teeth 46 are so arranged that when rod 45 is moving upwardly, arm 47 slides over the ratchet teeth and is flexed upwardly away from switch 44. Should rod 45 move downwardly (as viewed in FIGS. 5 and 6) with respect to container 11, ratchet teeth 46 engage the end of arm 47, pulling arm 47 downwardly into the dotted-line position shown in FIG. 6 and causing it to actuate switch 44. The actuation of switch 44, as shown in FIG. 8, actuates the explosive charges 29, venting the rockets.

In operation, the venting probe shown in FIGS. 5 and 6 works generally in a manner similar to the sensing probe comprising lead ball 32 and cable 33 which has previously been discussed. Rod 45 will normally be in its furthermost downward position, as shown in full line in FIGS. 5 and 6, with enlarged head 49 resting upon the top of bracket 50. As soon as the bottom of rod 45 contacts the landing surface, the rod will be pushed upward in brackets 50 and 51. As long as container 11 continues its downward motion with respect to the landing surface, rod 45 will continue to rise upward in its mounting brackets, flexing arm 47 upward away from switch 44. Should the direction of motion of container 11 reverse, the weight of rod 45 will cause it to move downwardly with respect to container 11, flexing arm 47 downwardly into the dotted-line position as shown in FIG. 6 and actuating switch 44. As soon as the container motion changes, then, switch 44 will be actuated and, as a result, the rocket motors will be vented and extinguished.

Arm 47 may be made sufficiently stiff so that its engagement with ratchet teeth 46 will be sufficient to prevent rod 45 from riding upward in its mounting brackets at any time prior to the engagement of the bottom of rod 45 with the landing surface. Alternatively some other blocking means may be provided to prevent this undesirable movement, which blocking means will be released by the same electrical signal which actuates the rocket motors.

Figure 7:
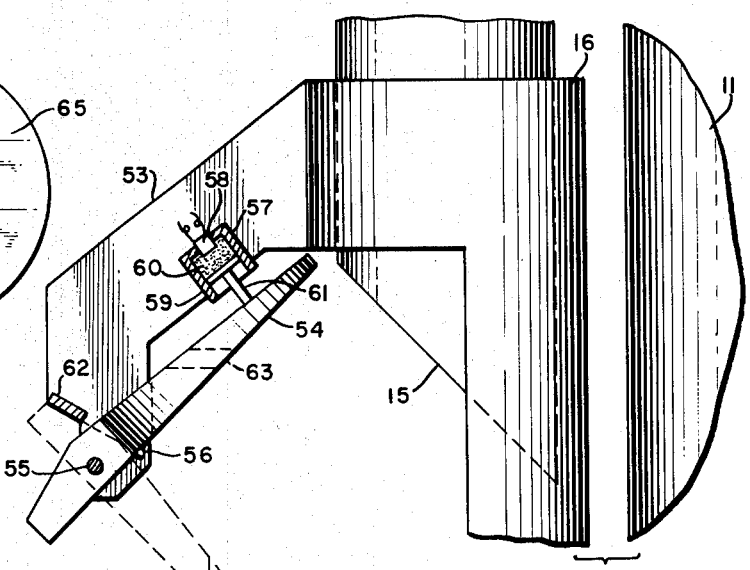
FIG. 7 is a side elevational view, partly in section, of a rocket thrust dispersion means which may be used as part of this invention.
Figure 9:
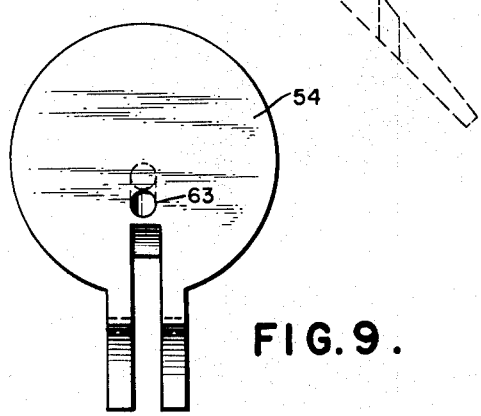
FIG. 9 is a top plan view of the spoiler plate used in the embodiment of FIG. 7.

As has already been mentioned, rather than extinguishing the rockets upon occurrence of a reversal of motion of the container, the rocket thrust may be partially or completely dissipated or spoiled. FIG. 7 shows a device utilizing a spoiler plate for deflecting all but a very small portion of the rocket thrust upon the occurrence of a bounce. A bracket 53 is attached to the upper portion of shield 16 and extends downwardly and outwardly, having a spoiler plate 54 pivotally attached at a point near its end by pin 55. A shear pin 56 mounted upon bracket 53 supports the lower edge of spoiler plate 54 and maintains it in an upwardly directed, retracted position, out of the path of the blast from nozzle 15. An explosive device 57 is attached to bracket 53, and comprises an explosive chamber 59 in which are mounted an electrically operated detonator 58 and an explosive charge 60. In the open end of cup-shaped chamber 59 is located a piston 61 whose end rests upon, or may be mechanically attached to, the surface of spoiler plate 54 at a point close to its end. The electrically operated detonators 58 (one corresponding to each rocket motor) may be parallel connected through normally open switch 44 to a source of voltage in the same manner as were charges 29 in FIG. 8. Upon the occurrence of a bounce, the sensor supplies an electrical signal to the detonators 58 and they in turn ignite explosive charge 60, blowing piston 61 out from explosive chamber 59 and causing pin 56 to be sheared and spoiler plate 54 to be thrust downwardly into the path of the blast of combustion material from nozzle 15. As soon as the edge of plate 54 enters the nozzle blast, the force of the blast will throw it downwardly into its fully open position (shown dotted in FIG. 7), with its end butted against retainer 62 which is mounted upon and extends outwardly from bracket 53. In its fully extended position, each spoiler plate 54 will deflect all of the blast of combustion materials from its corresponding nozzle 15 except for that small portion which passes through orifice 63. Orifices 63 are so designed that the total thrust of the rocket blast which manages to pass through them will be insufficient to move load container 11 upward against the force of the ambient gravitational field, and so the combined effect of the small amount of the blast which manages to pass through orifices 63 will merely be to cushion the final few feet of descent of container 11 onto the landing surface.

Figure 10:
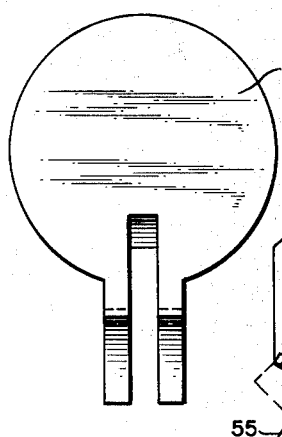
FIG. 10 is a top plan view of a spoiler plate similar to that shown in FIG. 9 but designed to dissipate all of the rocket thrust.

Spoiler plate 65, as shown in FIG. 10, represents an alternative construction, in which the small orifice through the center of the plate is omitted, and the plate when deflected downwardly into a fully open position will deflect the entire amount of the blast, rendering the rockets completely ineffectual.

It is understood, of course, that either of the motion reversal sensing means described above may be used in conjunction with any of the means for eliminating or modifying the effect of the rocket thrust.

What is claimed is:

1. In combination with apparatus for cushioning the landing of a descending load, such apparatus including reaction motor means adapted to generate thrust of such direction and magnitude as to oppose the descent of the load, control means for preventing "bounce" in the event that such thrust is excessive to such an extent as to cause reversal of motion of the load, said control means comprising motion-responsive means operative to provide a control function only upon occurrence of a reversal of motion of the load from a descending direction to an ascending direction; and means operatively associated with said motion-responsive means and the reaction motor means and operated by said control function to so modify the thrust of the reaction motor means that the thrust will not sustain the ascending motion of the load.

2. In combination with apparatus for cushioning the landing of a descending load, such apparatus including reaction motor means adapted to generate thrust of such direction and magnitude as to oppose the descent of the load, control means for preventing "bounce" in the event that such thrust is excessive to such an extent as to cause reversal of motion of the load, said control means comprising motion-responsive means operative to provide a control function only upon occurrence of a reversal of motion of the load from a descending direction to an ascending direction; and means operated by said motion-responsive means and operatively associated with the reaction motor means to render the reaction motor means totally inoperative to generate further thrust upon the sensing of reversal of motion of the load by said motion-responsive means.

3. In combination with apparatus for cushioning the landing of a descending load, such apparatus including reaction motor means adapted to generate thrust of such direction and magnitude as to oppose the descent of the load, control means for preventing "bounce" in the event that such thrust is excessive to such an extent as to cause reversal of motion of the load, said control means comprising motion-responsive means operative to provide a control function only upon occurrence of a reversal of motion of the load from a descending direction to an ascending direction; and means operated by said motion-responsive means and operatively associated with the reaction motor means for effectively dissipating substantially all of the thrust developed by the reaction motor means after the sensing of reversal of motion of the load by said motion-responsive means.

4. Apparatus in accordance with claim 3 and wherein said last-mentioned means comprises at least one spoiler mounted for movement, from an inactive position to an operative position in which the spoiler is interposed in the path of the thrust generated by the reaction motor means, and power means for actuating said spoiler to said operative position.

5. In combination with apparatus for cushioning the landing of a descending load, such apparatus including at least one rocket adapted to generate thrust of such direction and magnitude as to oppose the descent of the load, control means for preventing "bounce" in the event that such thrust is excessive to such an extent as to cause reversal of motion of the load, said control means comprising motion-responsive means operative to provide a control function only upon occurrence of a reversal of motion of the load from a descending direction to an ascending direction; and means operated by said control function to extinguish said at least one rocket upon the sensing of reversal of motion of the load by said motion-responsive means.

6. In a device for cushioning the landing of a descending load, the combination of frame means to be connected to the load for descent therewith;

reaction motor means mounted on said frame means and operative, when activated, to generate thrust opposing the descent of the load;

a reversal of motion sensing device carried by said frame and operative, when activated, to provide a control function only upon occurrence of reversal of motion of the load from a descending direction to an ascending direction;

means for substantially concurrently activating said reaction motor means and said reversal of motion sensing device; and control means operatively associated with said reversal of motion sensing device and said reaction motor means and operated by said control function to so modify the thrust of said reaction motor means that the same will not sustain the ascending motion of the load.

7. In an apparatus for cushioning the landing of a load, the combination of frame means to be connected to the load;

a plurality of rocket motors each comprising a chamber for enclosing a solid propellant charge, each of said chambers having a discharge nozzle and a vent opening, said rocket motors being mounted on said frame means in positions such that gases discharged via said nozzles generate thrust in opposition to the direction of intended travel of the load;

means for firing said rocket motors;

motion-responsive means mounted on said frame means and operative to sense reversal of motion of the load;

a plurality of closures each arranged to close a different one of said vent openings; and means operatively connected to said closures and controlled by said motion-responsive means for accomplishing removal of said closures, to vent said chambers and render said rocket motors inoperative, when said motion-responsive means senses such reversal of motion.

8. In an apparatus for cushioning the landing of a descending load, the combination of frame means to be connected to the load;

at least one reaction motor device mounted on said frame means and effective to generate thrust in opposition to the descending travel of the load;

means operative to place said reaction motor device in operation to generate thrust as the load approaches the landing surface;

motion-responsive means mounted on said frame means and operative to provide a control function only upon occurrence of a reversal of motion of the load in the event the thrust generated by said reaction motor device is excessive to such an extent that descent of the load is stopped and the load then driven in the opposite direction by such thrust; and means operatively associated with said reaction motor device and controlled by said control function of said motion-responsive means for reducing the effective thrust of said reaction motor device to a low level inadequate to drive the load in said opposite direction, but adequate to cushion landing thereof, upon occurrence of such reversal of motion.

9. Apparatus in accordance with claim 8 and wherein said last-mentioned means comprises a thrust-dissipating device operative to dissipate a portion of the total thrust generated by said reaction motor device.

10. Apparatus in accordance with claim 9 and wherein said thrust-dissipating device is a spoiler arranged for movement from an inactive position to an operative position in which said spoiler is effective to deflect all but a portion of the discharge from said reaction motor device.

References Cited by the Examiner
UNITED STATES PATENTS

| | | | |
|---|---|---|---|
| 2,693,327 | 11/1954 | Hild | 244—138 |
| 2,945,649 | 7/1960 | Metcalf et al. | 244—77 |

FOREIGN PATENTS

| | | |
|---|---|---|
| 572,836 | 3/1959 | Canada. |

MILTON BUCHLER, *Primary Examiner.*

FERGUS S. MIDDLETON, *Examiner.*